May 20, 1952  J. BAILEY  2,597,558
METHOD OF MANUFACTURING PLASTIC ARTICLES
Filed June 8, 1948

INVENTOR
JAMES BAILEY

BY Parham + Bates

ATTORNEYS

Patented May 20, 1952

2,597,558

UNITED STATES PATENT OFFICE 2,597,558

METHOD OF MANUFACTURING PLASTIC ARTICLES

James Bailey, West Hartford, Conn., assignor to Plax Corporation, West Hartford, Conn., a corporation of Delaware Application June 8, 1948, Serial No. 31,715

9 Claims. (Cl. 18—55)

This invention relates to the production of hollow articles, such as containers, from plastic materials which are capable of being softened and made workable by heating at relatively low temperatures and which may be expanded under fluid pressure into articles of desired shapes, and thereafter rigidified.

It has previously been proposed (see U. S. patent to Kopitke, No. 2,260,750 issued October 28, 1946) to make containers from organic plastic materials by first forming the material into a tubular form, closing the leading end of the tubular body of material, extruding an elongated bubble, and blowing the bubble within a blow-mold to form a bottle and then severing the neck of the bottle from the tubular material. Thereafter, the bottle is removed from the mold and any excess material trimmed from the neck to provide a finished lip.

While quantity production of plastic bottles has been obtained, difficulty has been experienced in preventing the neck portion of the bottle from being drawn or sagging inwardly away from the neck-forming portion of the mold during or following severance from the tubular material. This distortion of the neck has resulted in a poor "pack," i. e. low percentage of acceptable bottles from bottles formed. While the percentage of rejects has been reduced by raising the line of severance considerably above the level at which the lip is subsequently trimmed, it has not sufficiently reduced the percentage of bottles with defective necks and, by increasing the size of the moil, has increased the scrap produced with each acceptable bottle.

The present invention provides improvements in molding methods and apparatus employed to make hollow articles and has for its general object more economical production of such articles.

A further object of the present invention is to provide an improved method and apparatus for forming open ended articles, such as bottles, with accurate neck portions and with a minimum moil and scrap loss.

The manner in which the above and other objects and advantages are accomplished or obtained is pointed out or apparent in the detailed description which follows and which has reference to the accompanying drawings which show a preferred form of molding apparatus embodying the invention and the method employed in its use.

Figure 1:
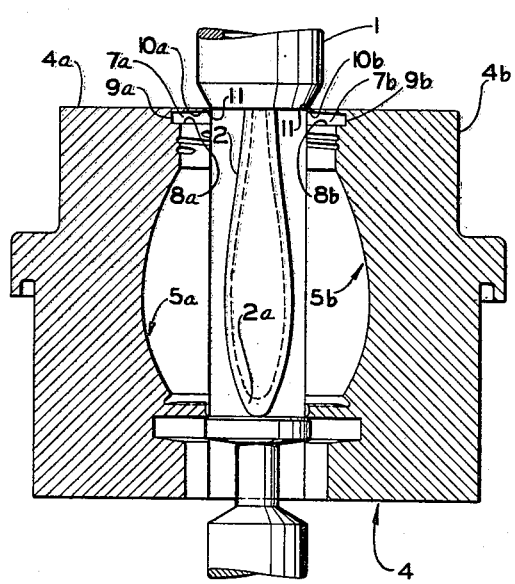
Fig. 1 is a side elevation in cross-section of a double section blow mold in open position showing a tube of plastic material therein.
Figure 2:
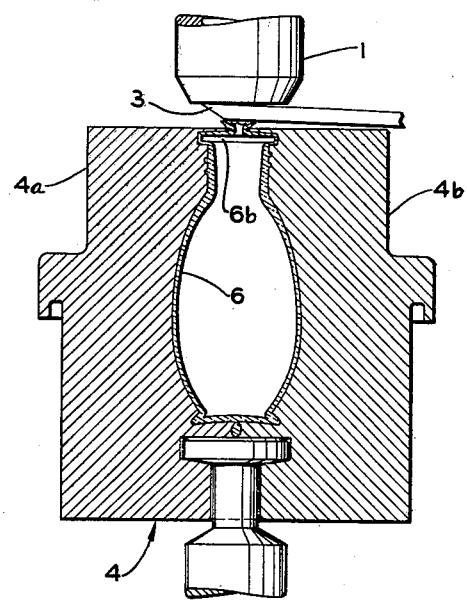
Fig. 2 is a view similar to Fig. 1 showing the tube blown into forming contact with the closed mold members and severed from the extruder.
Figure 3:
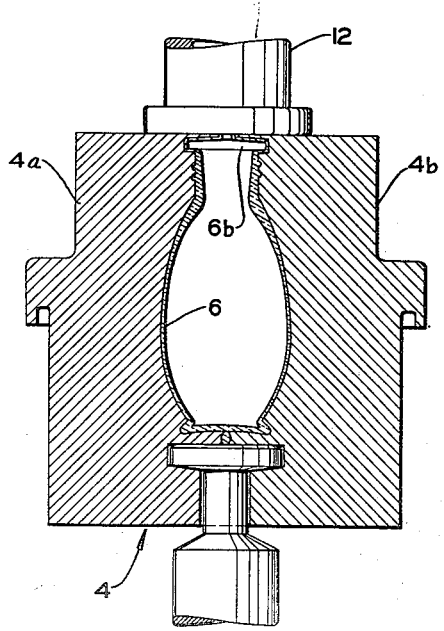
Fig. 3 is a view similar to Fig. 2 showing a subsequent step in the formation of the blown bottle and a novel integral lip moil.

Referring more particularly to Figs. 1 and 2, there is illustrated the outlet or extrusion end I of a nozzle from which thermoplastic material is extruded in a tubular form 2, reference may be made to the aforementioned patent to Kopitke and to the latter's U. S. Patent No. 2,349,176 for details of suitable extruders and extruder nozzles of which the outlet end I may be a part. The closing of the leading end 2a of the tubular material may be effected by the smearing action of a cut-off knife blade 3 following completion of the preceding bottle-forming operation. Thereafter, the tubular material 2 is extruded from the nozzle I as an elongated bubble from which a hollow molded article, such as a bottle, may be blown within a two-section mold indicated generally by the numeral 4. The two sections 4a and 4b of the mold 4 meet in a vertical plane and may be moved to the opened and closed positions illustrated in Figs. 1 and 2.

Figure 4:
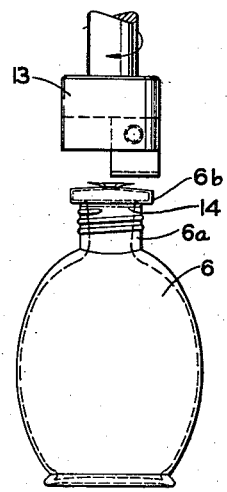
Fig. 4 is a front elevation of the bottle and a cutter for removing the moil.

In the embodiment illustrated, the mold sections 4a and 4b respectively contain mold cavities 5a and 5b which are shaped to form a bottle or flask 6 (Fig. 4) including a threaded neck portion 6a and a bulbous projection 6b, the details of which are described hereinafter.

Referring more particularly to the mold cavities 5a and 5b, the lower portions may be shaped to form the bottom, body and neck portions of any desired type of bottle. The cavities 5a and 5b include deepened recesses 7a and 7b at the upper ends of, and of greater diameter than, the neck-forming portions of the cavities. In the closed position of the mold members, the recesses 7a and 7b define an annular depression in which to form the bulbous projection 6b shown at the top of the bottle in Fig. 4. The depression 7a and 7b are respectively formed by lower horizontal shoulder portions 8a and 8b; by vertical periphery wall portions 9a and 9b and by shallow pitched, inwardly and upwardly sloping top wall portions 10a and 10b. The latter are cut away at the mold parting line to provide a centrally disposed passageway 11 extending vertically through the top of the closed mold members.

The operation of the above described molding mechanism is as follows:

The hollow tube 2 of plastic material is extruded from the nozzle 1 downwardly between the open mold members to the position illustrated in Fig. 1. Thereafter, the mold members 4a and 4b are closed and the tube 2 blown into surface contact with the mold cavity walls by air pressure. Thereafter, the nozzle 1 is raised from the mold 4 and the cut-off or shearing blade 3 acts to sever the connection between the plastic in the mold and in the extrusion nozzle 1 and, at the same time, to smear and close the leading end 2a of the tubular material 2 within the nozzle preparatory to the next extrusion operation. Any failure of the blade 3 to completely close the end of the tube is rectified by the mold members 4a and 4b which act to pinch the leading end 2a and reseal the bottom of the tube.

The embodiment of the invention illustrated, contemplates moving the closed mold 4 to a cooling station at which a blowhead 12 is employed to maintain air pressure within the molded bottle 6 while the bottle is cooled and set in the shape imparted by the mold. Should the shearing action of the cutter 3 draw a portion of the plastic material from contact with the bulb-forming cavity 7a, 7b, the air pressure from the blowhead 12 will reestablish the plastic in proper surface forming contact with the mold cavity walls.

It will be appreciated that the passageway 11, which is of relatively small diameter compared to the neck portion 6a of the bottle, together with the greater diameter and shallow depth of the bulb portions 6b relative to the neck portion 6a of the bottle, cooperate to minimize or entirely eliminate the transmittal to the neck portion 6a of any lateral distorting stress produced by the cutter 3. An additional factor in the elimination of distorting stress on the neck 6a is the thinness of the wall of the bulbous projection 6b relative to the wall of the neck 6a.

The annular projection of the bulb 6b into the mold members 4a and 4b also acts to eliminate any axial stress on the neck portion 6a which the retraction of the nozzle 1, otherwise, might exert.

Figure 5:
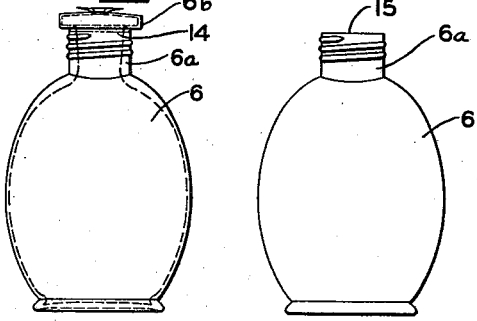
Fig. 5 is a front elevation of the bottle with the moil removed.

Following cooling, the bottle 6 may be removed from the mold and the bulbous projection 6b removed as by a facing tool 13 (Fig. 4) to produce the finished bottle shown in Fig. 5. Inasmuch as distortion of the neck 6a is completely eliminated, the bulbous projection 6b may be located at or closely contiguous to the cut-off line 14 at which the neck is trimmed to form the finished lip 15.

Various changes may be made in the details of construction and in the performance of the method without departing from the scope of the claims. The invention may be employed in forming tubing or hollow articles or containers from thermosetting compositions, it being understood that where thermosetting compositions are employed, the articles will be hardened or rigidified by further heating rather than by cooling.

Having thus described my invention, what I claim is:

1. The process of forming hollow articles of organic plastic material which comprises extruding a tube of such material from an extrusion nozzle, closing a sectional mold about a portion of the tube, closing the leading end of said tube, expanding said closed tube into contact with said mold to form within the mold a container including a neck portion having a bulbous moil, severing said moil and container from the tube, applying fluid pressure to the interior of said mold and container and setting said container against further plastic deformation, removing said container and moil from within the mold and cutting the bulbous moil from the neck portion.

2. The process recited in claim 1 and wherein the moil is severed from plastic material in the extrusion nozzle following expansion of the tube and prior to removal of the moil and the container from the mold.

3. The process recited in claim 1 and wherein the bulbous moil is expanded to a thinner cross-section than the neck of the container.

4. The process recited in claim 1 and wherein the bulbous moil is expanded to a greater width and lesser height than the width of the neck portion of the container.

5. The process recited in claim 1 and wherein the diameter of a portion of the tube adjacent the bulbous moil is reduced.

6. The process of forming of plastic material a hollow container having a continuous lip portion which comprises forming a tube of said material, expanding a portion of said tube to shape within a confining mold a container with a flared portion integral with and extending immediately outward from said container, separating said container and flared portions from said tube and thereafter applying fluid pressure to the interior of said container and flared moil, setting said container and moil against further plastic deformation, and severing said flared portion from said container to form a lip on said container.

7. The process of forming of plastic material a hollow container having a continuous lip which comprises forming a tube of said material, expanding a portion of said tube within a mold by fluid pressure to shape said container and an integral, flared moil extending outwardly from said container within said mold, separating said flared portion from said tube, applying fluid pressure to the interior of said container and flared moil, removing said container and flared portion from within the mold and thereafter severing said flared portion from said container to form said lip.

8. The process of forming of plastic material a hollow container having a continuous lip which comprises forming a tube of said material, expanding a portion of said tube within a mold by fluid pressure to shape said container with an integral, flared moil extending outwardly from said container, separating said flared portion from said tube, thereafter applying fluid pressure to the interior of said container and flared moil, setting said container and moil against further plastic deformation, removing said container and integral moil from within the mold, and severing said flared moil portion from said container to form said lip.

9. The process of forming of organic thermoplastic material a hollow container having a continuous lip which comprises extruding a tube of said material from a nozzle, closing a mold on a portion of the tube, expanding the portion of the tube within the mold by fluid pressure to shape said container with an integral flared moil extending outwardly from said container, separating said mold containing said container and moil from the nozzle, thereafter setting said container and moil against further plastic deformation while applying fluid pressure to the interior of said container and moil, removing the set container and integral moil from within the mold, and severing said flared moil portion from said container to form said lip.

JAMES BAILEY.

REFERENCES CITED

The following references are of record in the file of this patent:

UNITED STATES PATENTS

| Number | Name | Date |
|---|---|---|
| 759,718 | Kaye | May 10, 1904 |
| 1,592,299 | Howard | July 13, 1926 |
| 2,260,750 | Kopitke | Oct. 28, 1941 |
| 2,262,612 | Kopitke | Nov. 11, 1941 |
| 2,315,478 | Parkhurst | Mar. 30, 1943 |
| 2,402,452 | Schreiber | June 18, 1946 |